(12) United States Patent
Michalske et al.

(10) Patent No.: US 8,134,336 B2
(45) Date of Patent: Mar. 13, 2012

(54) METHOD AND SYSTEM FOR CHARGING A SERIES BATTERY

(75) Inventors: Steven C. Michalske, Sunnyvale, CA (US); Thomas C. Greening, San Jose, CA (US); P. Jeffrey Ungar, Sunnyvale, CA (US); William C. Athas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 12/479,343

(22) Filed: Jun. 5, 2009

(65) Prior Publication Data

US 2010/0308770 A1    Dec. 9, 2010

(51) Int. Cl.
*H02J 7/04* (2006.01)
(52) U.S. Cl. .................. 320/116; 320/134; 320/136
(58) Field of Classification Search .............. 320/116, 320/134, 136
See application file for complete search history.

(56) References Cited

U.S. PATENT DOCUMENTS

| 5,637,979 | A | 6/1997 | Tamai et al. |
| 6,172,485 | B1 * | 1/2001 | Fujita et al. .................. 320/136 |
| 6,291,972 | B1 | 9/2001 | Zhang |
| 2009/0102421 | A1 | 4/2009 | Imai |

FOREIGN PATENT DOCUMENTS

EP    1940003 A2    7/2008

* cited by examiner

*Primary Examiner* — Reena Aurora
(74) *Attorney, Agent, or Firm* — Park, Vaughan, Fleming & Dowler LLP

(57) ABSTRACT

Some embodiments of the present invention provide a system for charging a series battery, wherein the series battery is comprised of a set of banks which are connected in series, so that the same charging current passes through each bank. During the charging process, the system measures a voltage across each bank in the set of banks. The system then compares the measured voltage with a target voltage for each bank, and adjusts the charging process based on results of the comparisons between the measured voltage and the target voltage.

28 Claims, 6 Drawing Sheets

METHOD AND SYSTEM FOR CHARGING A SERIES BATTERY

BACKGROUND

1. Field

The present invention relates to techniques for charging a battery. More specifically, the present invention relates to a method and an apparatus for charging a set of battery cells which are coupled together in series.

2. Related Art

Battery performance is critical to the effective operation of portable computing devices, such as laptop computers. To provide higher supply voltages, banks of battery cells are typically stacked in series inside a battery pack. More specifically, a battery is often constructed from cells in a series-parallel combination. Cells of the same type, but possibly different coulomb capacities, may be connected in parallel to form what is effectively a single, larger capacity cell, called a "bank". Two or more closely matched banks may be connected in series to provide a higher supply voltage, which may be required for some of the system components, or to meet power efficiency goals.

A series battery is typically charged with reference to a voltage V across the entire battery under the assumption that the cells are well-balanced in capacity and state-of-charge. For example, FIG. 1 illustrates how a charger 102 is used to charge a series battery comprised of banks 104, 106 and 108, which are connected together in series. Note that charger 102 controls the charging process based on a voltage V 110 across the entire series battery. Ideally, if the voltage is V for a battery comprised of m banks connected in series, the voltage of any one bank is V/m. However, in practice there are always discrepancies, so some banks are at a voltage higher than V/m and others are lower. If the discrepancies are uncontrolled and the battery is charged according to its total series voltage V, some cells may be overcharged and experience a shortened service life.

Some systems provide for rebalancing to reduce these discrepancies. However, they do so gradually, and only for static, relaxed conditions. Even with perfect static balance, there can be a significant imbalance in the bank voltages during charging if the cells have differing transport properties, which may be caused, for example, by manufacturing variability or temperature differences.

Hence, what is needed is a technique for charging a series battery that does not suffer from the above-mentioned problems.

SUMMARY

Some embodiments of the present invention provide a system for charging a series battery, wherein the series battery is comprised of a set of banks which are connected in series, so that the same charging current passes through each bank. During the charging process, the system measures a voltage across each bank in the set of banks. The system then compares the measured voltage with a target voltage for each bank, and adjusts the charging process based on results of the comparisons between the measured voltage and the target voltage.

In some embodiments, comparing the measured voltage with the target voltage for each bank involves computing differences between the measured voltage and the target voltage for each bank in the set of banks to produce a set of differences. In these embodiments, adjusting the charging process involves adjusting the charging process based on the set of differences.

In some embodiments, adjusting the charging process based on the set of differences involves: determining a minimum difference in the set of differences; and adjusting the charging process based on the minimum difference.

In some embodiments, the system additionally determines a temperature (and possibly a state-of-charge) for each bank in the set of banks, and then determines the target voltage for each bank based on one or more of: the temperature of the bank, the state-of-charge of the bank, and the bank's open circuit voltage characteristics.

In some embodiments, each bank includes one or more battery cells which are connected in parallel.

In some embodiments, adjusting the charging process involves adjusting the charging process based on joint current and voltage limits.

In some embodiments, if the current limit is $I_L$ and the voltage limit is $V_L$, the charging process can supply: a constant current of $I_L$ at a voltage less than $V_L$; or a constant voltage of $V_L$ with a current less than $I_L$.

In some embodiments, during the charging process, the system first supplies a constant current. Next, when a threshold is reached, the system supplies a constant voltage.

In some embodiments, adjusting the charging process involves using a closed-loop control system, which uses results of the comparisons between the measured voltages and the target voltages to control the charging process.

In some embodiments, the closed-loop control system uses a proportional-integral-derivative (PID) controller.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Charging a Series Battery

Figure 2:
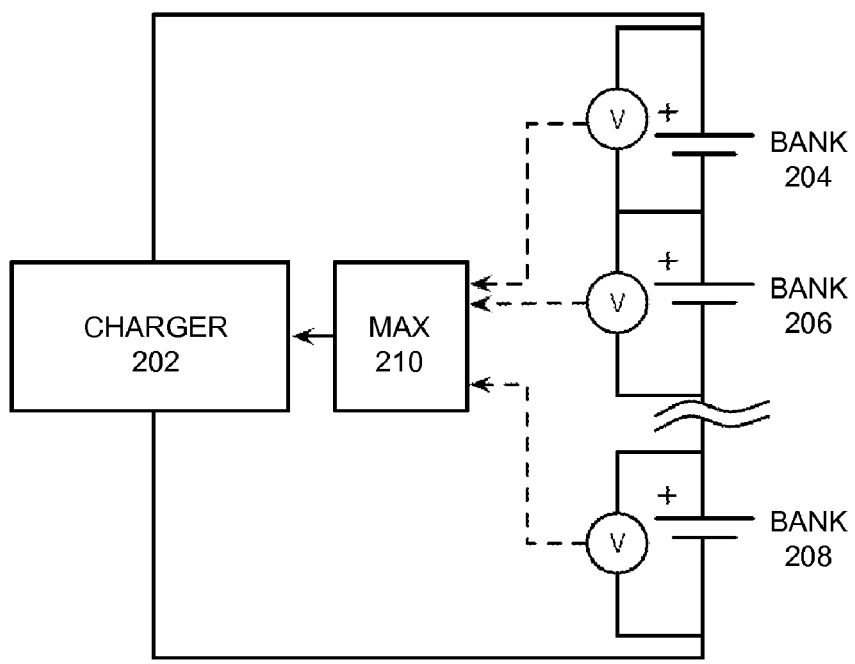
FIG. 2 illustrates a charger for a series battery which monitors voltages for the individual banks in the series battery in accordance with an embodiment of the present invention.

One embodiment of the present invention provides a system that charges a series battery comprised of m banks through closed-loop control of the most extreme bank voltage ($V_1 \ldots V_m$) with respect to a specified set point. Depending on the transport dynamics of the banks, the bank that is the most extreme relative to the target voltage may change during the charging process. For example, FIG. 2 illustrates a system that reads all the bank voltages (from banks 204, 206 and 208) and then uses a mechanism 210, such as a circuit or a microprocessor, to determine a maximum of the measured voltages. The charger 202 then uses this maximum to control the charging process.

Some embodiments of the present invention facilitate charging a series battery in essentially the same manner as charging a single battery cell. In this way, any technique that can be used to charge a single battery cell can be used to charge the series battery. For example, a simple constant current/constant-voltage (CC/CV) scheme of 0.5 C/4.2V (where 1 C corresponds to a full coulomb capacity of charge per hour) for charging a lithium-ion cell translates directly into a process for charging a series battery pack made from the same cells. The profile is still 0.5 C/4.2V, but C is now the battery capacity per hour.

A significant advantage of this technique is that no bank will exceed the voltage target of 4.2V. More generally, a charging technique will set voltage targets according to the evolving state of the battery, and the advantage is obtained throughout the charging process, not only toward the end of the charging process. Some more complex charging techniques that will additionally benefit include, but are not limited to, multi-step CC/CV profiles, and advanced adaptive charging schemes, such as Adaptive Surface Concentration Charging, which is described in U.S. patent application Ser. No. 12/242,700, entitled "Adaptive Surface Concentration Battery Charging", by inventors Thomas C. Greening, P. Jeffrey Ungar and William C. Athas, filed 30 Sep. 2008.

Figure 3:
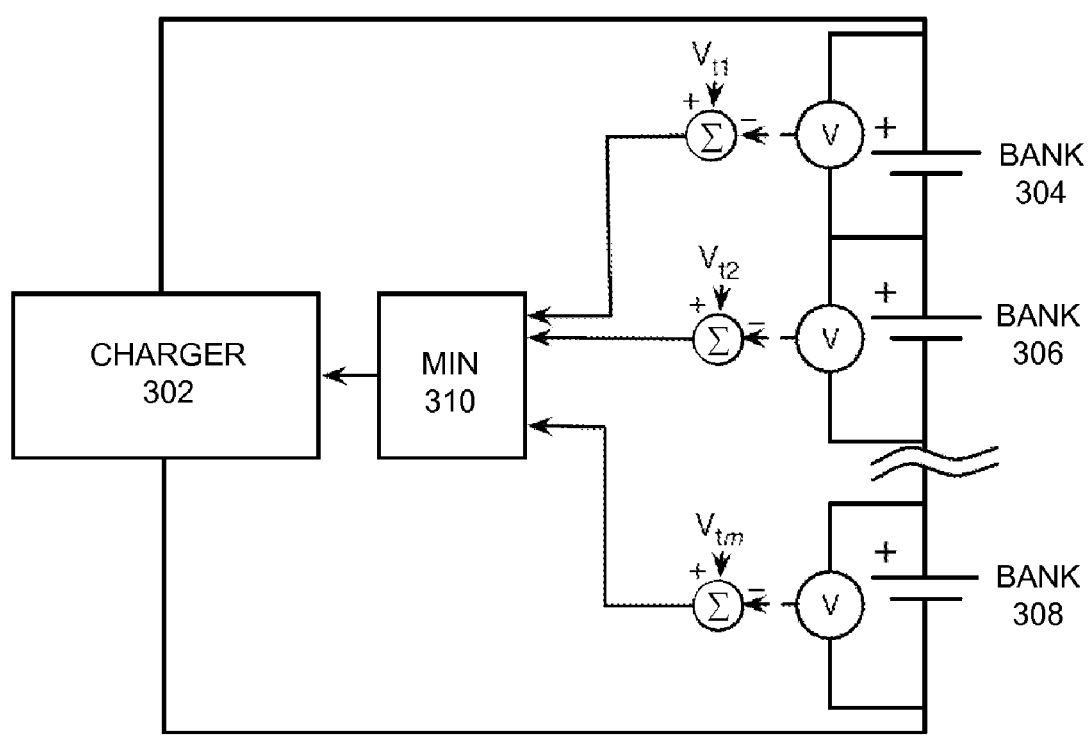
FIG. 3 illustrates a charger for a series battery which monitors voltages for the individual banks in the series battery and compares them against target voltages for the individual banks in accordance with an embodiment of the present invention.

Embodiments of the present invention readily generalize to allow for an individual voltage target for each bank, in which case the charger responds to the bank with the most negative difference between its target and its actual voltage. This is illustrated in FIG. 3 which illustrates how voltages are measured for banks 304, 306 and 308. These measured voltages are then subtracted from target voltages $V_{t1}$, $V_{t2}$ and $V_{tm}$, respectively to produce a set of differences. These differences are fed into a mechanism 310, such as a circuit or a microprocessor, which computes the minimum of the differences. This minimum difference is used by charger 302 to control the charging process. (Note that one case where the voltage targets may be different occurs when the banks are at different temperatures. Other differences, such as bank-to-bank state-of-charge differences, may also result in different voltage targets depending on the charging technique. It is also possible to accommodate cells (banks) with somewhat different chemistries, in which case the target voltage can be determined from bank temperature, bank state-of-charge and bank open circuit voltage characteristics.)

Figure 1:
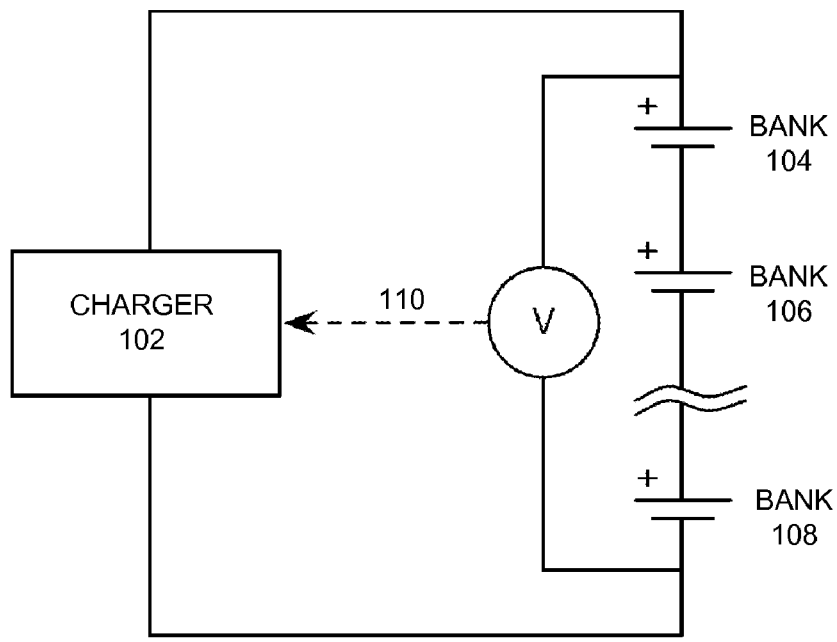
FIG. 1 illustrates a conventional charger for a series battery.

A battery charger (such as battery charger 302) usually operates within joint current and voltage limits. For example, if configured to operate with a current limit of 2 A and a voltage limit of 4V, then depending on the load the charger will either supply 4V at some current less than 2 A, or it will supply a current of 2 A at some voltage less than 4V. Many chargers are programmable so that one or both limits may be set dynamically via control signals. Some form of closed-loop feedback may be used to enforce the limits, as illustrated schematically in FIG. 1, where the voltage is read by the charger, which can then be used to enforce a voltage limit.

Figure 4A:
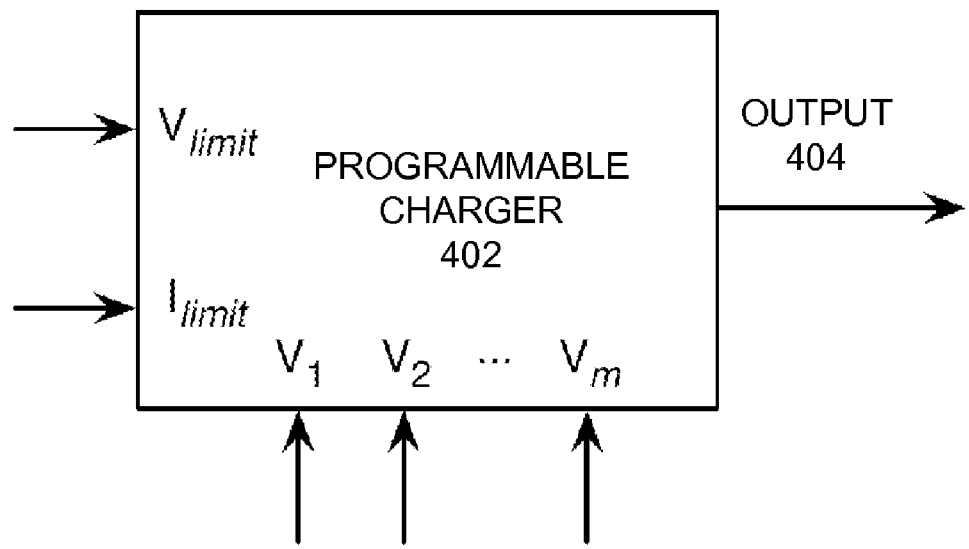
FIG. 4A illustrates a programmable charger for a series battery which adjusts the charging process based on measured voltages for individual banks in accordance with an embodiment of the present invention.

In one embodiment of the present invention, the charger senses not one voltage but m voltages, one for each bank, as is shown in FIG. 2. This charger then determines the maximum of these voltages and limits its output accordingly. FIG. 4A shows a programmable charger 402 that integrates this capability. The charger output 404 in FIG. 4A is regulated so that the current $I \leq I_{limit}$ and $\max(V_1, V_2, \ldots V_m) \leq V_{limit}$. In the more general case illustrated in FIG. 4B, the programmable charger 412 has a charger output 414, which is regulated so that $I \leq I_{limit}$ and $\min(V_{t1}-V_1, V_{t2}-V_2, \ldots V_{tm}-V_m) \geq 0$.

Another embodiment of the present invention facilitates specifying which voltage feedback lines are enabled, so that a single charger may be configured to handle batteries with different numbers of banks. It is also possible to specify a separate voltage limit for each bank as in FIG. 4B.

Figure 5:
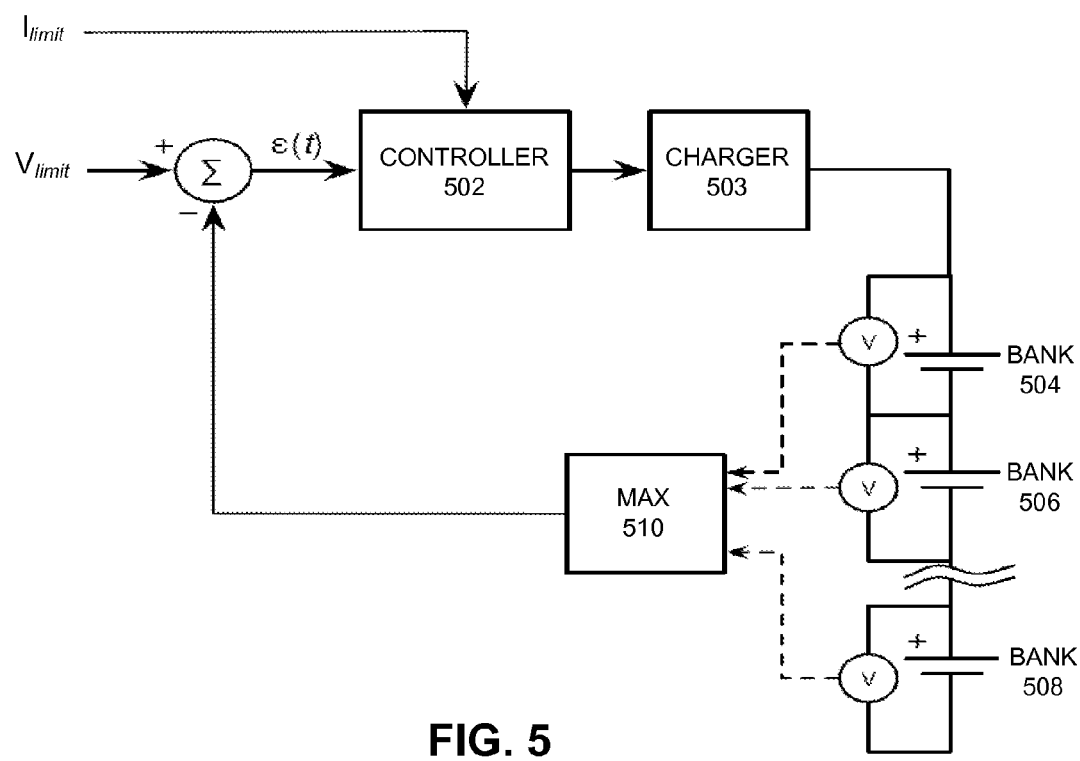
FIG. 5 illustrates a programmable charger for a series battery with an external feedback controller in accordance with an embodiment of the present invention.

Off-the-shelf battery chargers need an additional controller to operate like the integrated charger in FIG. 4A. In another embodiment of the present invention, a programmable charger is controlled to manage the bank voltages of banks 504-508 as shown in FIG. 5. In this embodiment, the error signal is the difference between the target voltage $V_{limit}$ and the maximum bank voltage 510, and this error signal is processed by a controller 502 and is used to adjust the settings on the charger 503. Like the integrated charger, a current limit may also be specified. Note that the charger actuator signal may be a current limit setting or a voltage limit setting. If the system is adjusting the charger current setting, the controller respects the current limit $I_{limit}$ and the charger's native voltage limit may be set to any value large enough to allow a full battery charge. On the other hand, if the system is adjusting the charger voltage setting, the current limit may be set directly on the charger.

Figure 4B:
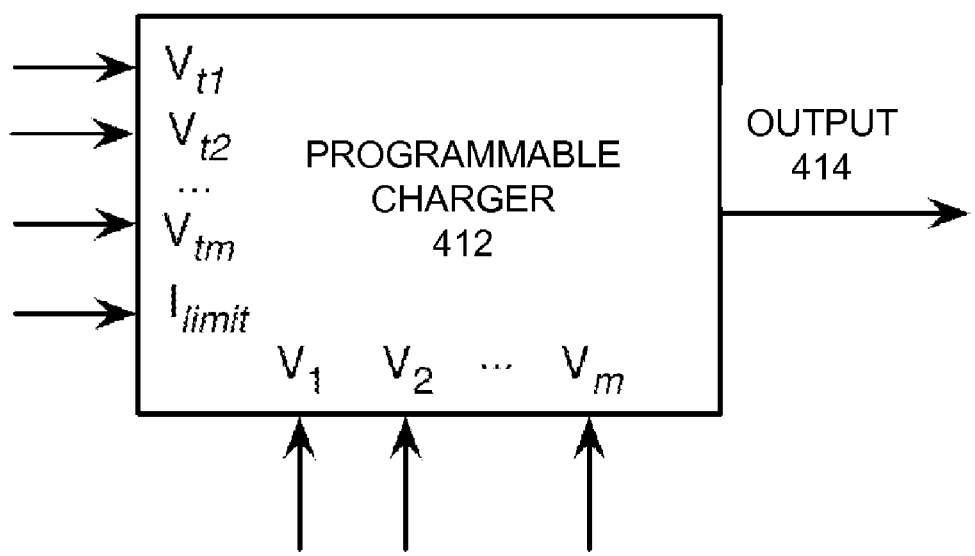
FIG. 4B illustrates a programmable charger for a series battery which adjusts the charging process based on measured voltages and target voltages for individual banks in accordance with an embodiment of the present invention.
Figure 6:
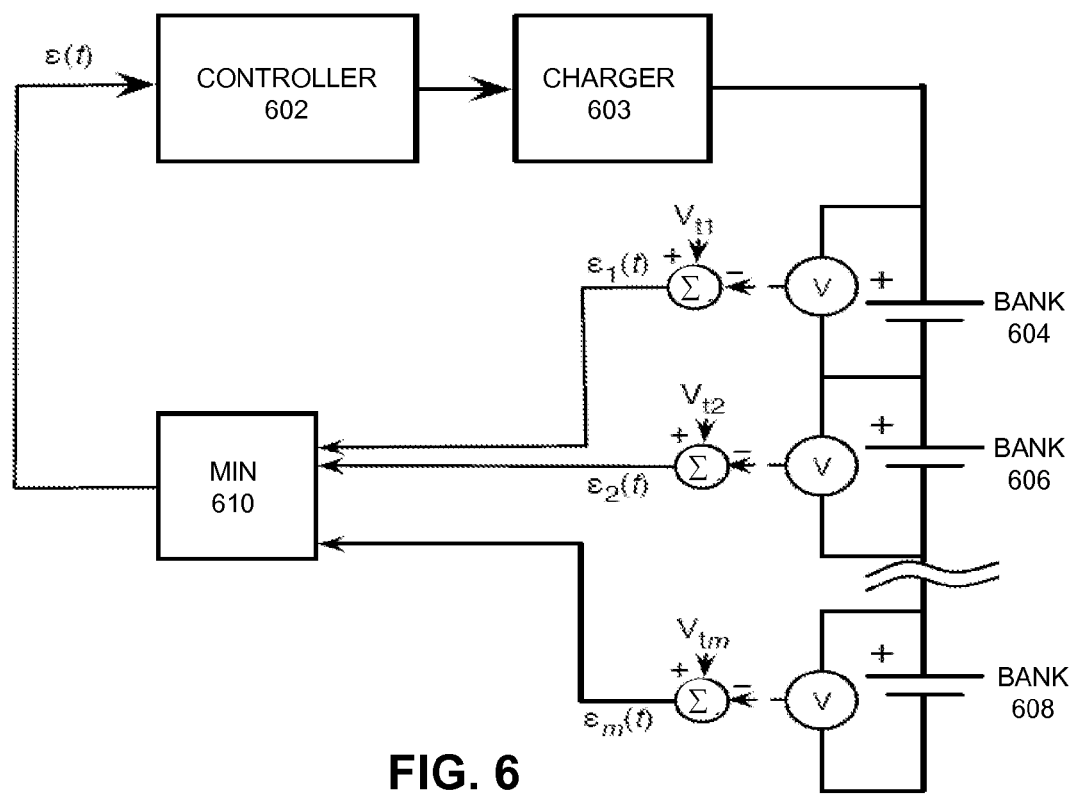
FIG. 6 illustrates a programmable charger for a series battery with an external feedback controller that uses individual voltage targets for banks in accordance with an embodiment of the present invention.

FIG. 6 shows an embodiment of the more general charger in FIG. 4B that supports individual bank voltage limits. In this embodiment, the error signal, which feeds into the controller 602 and is used to control charger 604, is the most negative of the individual bank error signals, $\epsilon(t)=\min(\epsilon_1, \epsilon_2, \ldots \epsilon_m)$ associated with banks 604-608. This most-negative signal is generated by a mechanism 610, such as a circuit or a microprocessor, which generates $\epsilon(t)$. The operation of this embodiment is otherwise the same as the simpler version in FIG. 5.

Practical controllers may need to monitor conditions where the charger output that is applied to the battery does not match what was requested. This may occur, for instance, if the charger output has reached its native limits and some of its output is diverted to powering a load rather than to charging the battery.

In one embodiment of the present invention, the controller is a proportional-integral-derivative (PID) controller with integral wind-up protection to address charger limitations. In this embodiment, the bank voltage errors are $$\epsilon_i(t) = V_{ti} - V_i(t), \quad (1)$$

where the error is updated frequently, such as once per second. To charge conservatively, the most negative error of all of the banks is servoed to zero, so we take the error signal as $$\epsilon(t) = \min(\epsilon_1(t), \epsilon_2(t), \ldots \epsilon_m(t)). \quad (2)$$

In this case, the servo output for the PID controller is the charger voltage, $$V_{charger}(t) = K_P \cdot \epsilon(t) + K_I \int \epsilon(t) dt + K_D (d\epsilon(t)/dt), \quad (3)$$

where $K_P$ is the proportional gain, $K_I$ is the integral gain, and $K_D$ is the derivative gain. Note that the charging current could be controlled similarly.

When using a non-zero integral gain $K_1$, special considerations are required for the integral term initialization and prevention of integral wind-up when the output is limited. A logical initial integral term value would be the measured battery pack open-circuit voltage $V_{pack}$, so that the charger begins in a state with zero initial charging current. If the charger has a current limit, it is possible for the servo to set a voltage that cannot be achieved. To prevent integral wind-up, the integral term can be suspended if the current is limited by the charger. For systems where it is difficult to know precisely that the charger limit has been reached, the integral term can be resumed if the servo input error becomes negative.

It is important that the PID controller gains are tuned to prevent overshooting the bank voltage targets. Because the bank voltages change slowly and controller overshoot should ideally be avoided, there is no need to include a derivative term ($K_D$=0). The controller is thus simplified to a proportional-integral (PI) controller. An external controller, including the PID controller just described, may be implemented in a separate component, or may be incorporated into a battery pack's management unit (BMU), which can then specify the voltage or current the charger should apply. These divisions of functionality are consistent with those described by the Smart Battery Charger Specification (http://sbs-forum.org/specs/sbc110.pdf).

Charging Process

Figure 7:
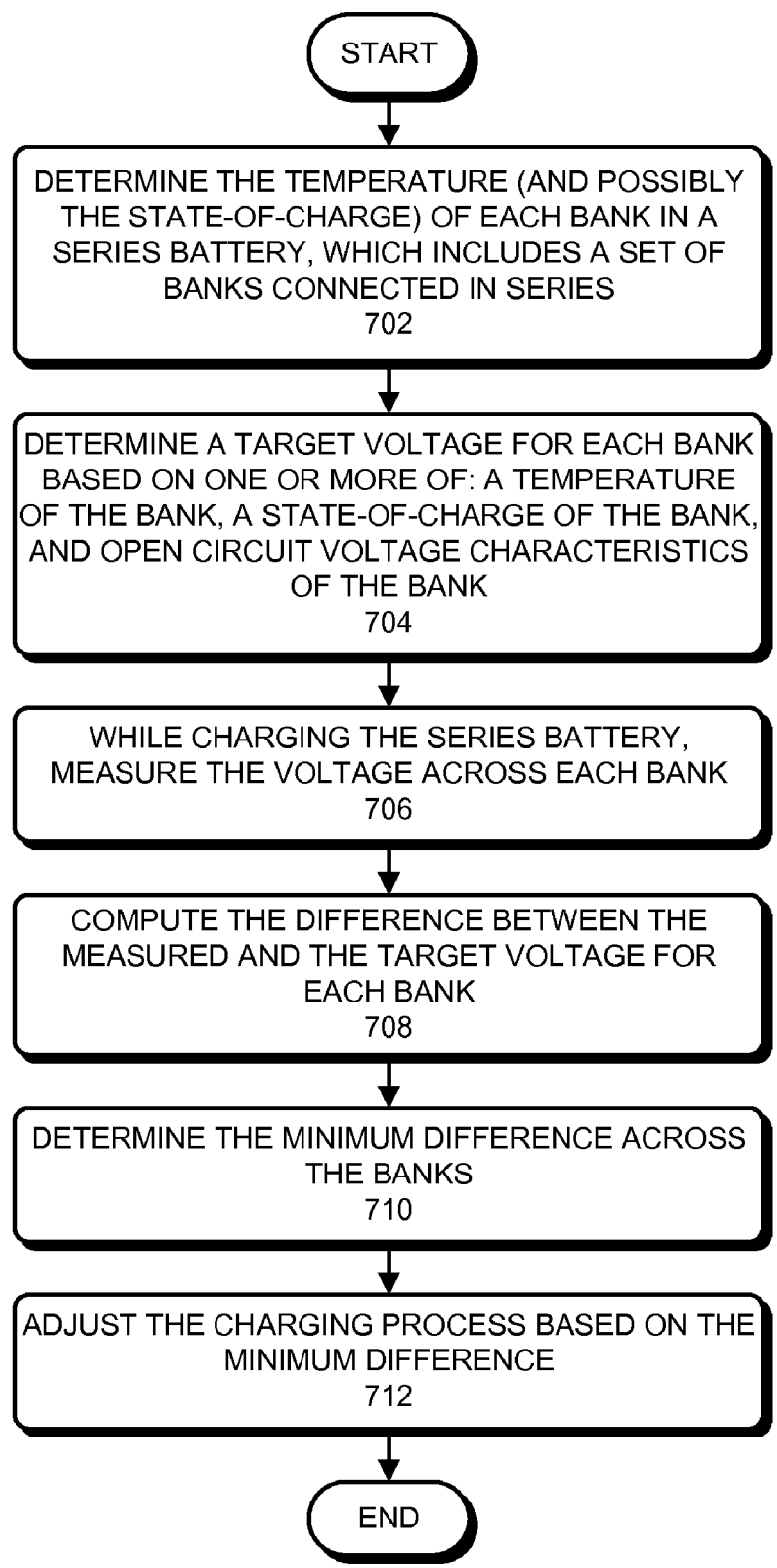
FIG. 7 presents a flow chart illustrating the charging process for a series battery in accordance with an embodiment of the present invention.

FIG. 7 presents a flow chart illustrating a process for charging a series battery in accordance with an embodiment of the present invention. First, before the charging starts, the system determines a temperature (and possibly a state-of-charge) for each bank in the set of banks (step 702). The system then determines a target voltage for each bank (step 704). Note that the optimal target voltage for a bank can vary based on one or more of: the temperature of the bank, the state-of-charge of the bank, and the bank's open circuit voltage characteristics.

Next, while the series battery is charging, the system measures the voltage across each bank in the battery (step 706). The system then computes the difference between the measured voltage and the target voltage for each bank (step 708), and then examines all of the differences to determine a minimum difference between the measured and target voltages across all of the banks (step 710). Finally, the system adjusts the charging process based on this minimum difference (step 712).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for charging a series battery, comprising:
  charging the series battery, wherein the series battery includes a set of banks which are connected in series, so that the same charging current passes through each bank in the set of banks;
  measuring a voltage across each bank in the set of banks as the series battery is charging;
  for each bank in the set of banks, comparing the measured voltage for the bank with a target voltage for the bank, wherein comparing the measured voltage with the target voltage comprises computing a difference between the measured voltage and the target voltage to produce a set of differences for the set of banks; and
  adjusting the charging process based on results of the comparisons between the measured voltage and the target voltage for each bank by limiting a voltage output for the charging process based on a result of a comparison of the differences in the set of differences.

2. The method of claim 1, wherein adjusting the charging process involves adjusting the charging process based on the set of differences.

3. The method of claim 2, wherein adjusting the charging process based on the set of differences involves:
  determining a minimum difference in the set of differences; and
  adjusting the charging process based on the minimum difference.

4. The method of claim 1, further comprising determining the target voltage for each bank in the set of banks based on one or more of: a measured temperature of the bank, a state-of-charge of the bank, and the bank's open circuit voltage characteristics.

5. The method of claim 1, wherein each bank includes one or more battery cells which are connected in parallel.

6. The method of claim 1, wherein adjusting the charging process involves adjusting the charging process based on joint current and voltage limits.

7. The method of claim 6, wherein if the current limit is $I_L$ and the voltage limit is $V_L$, the charging process supplies:
  a constant current of $I_L$ at a voltage less than $V_L$; or
  a constant voltage of $V_L$ with a current less than $I_L$.

8. The method of claim 7, wherein the charging process involves:
  first supplying a constant current; and
  when a threshold is reached, supplying a constant voltage.

9. The method of claim 1, wherein adjusting the charging process involves using a closed-loop control system, which uses results of the comparisons between the measured voltages and the target voltages to control the charging process.

10. The method of claim 1, wherein the closed-loop control system uses a proportional-integral-derivative (PID) controller.

11. A system for charging a series battery, comprising:
the series battery, wherein the series battery includes a set of banks which are connected in series;
a battery charger which is coupled to the series battery so that the same charging current passes through each bank in the set of banks;
a set of voltage monitors configured to measure a voltage across each bank in the set of banks as the series battery is charging;
a comparison circuit configured to compare the measured voltage for each bank with a target voltage for the bank, wherein, while comparing the measured voltage with the target voltage, the comparison circuit is configured to compute a difference between the measured voltage and the target voltage to produce a set of differences for the set of banks;
a controller within the battery charger configured to adjust the charging process based on results of the comparisons between the measured voltage and the target voltage for each bank in the set of banks by limiting a voltage output for the charging process based on a result of a comparison of the differences in the set of differences.

12. The system of claim 11,
wherein the controller is configured to adjust the charging process based on the set of differences.

13. The system of claim 12, wherein while adjusting the charging process based on the set of differences, the controller is configured to:
determine a minimum difference in the set of differences; and
adjust the charging process based on the minimum difference.

14. The system of claim 11, further comprising:
a set of temperature monitors configured to monitor a temperature for each bank in the set of banks; and
a target-voltage determination mechanism configured to determine the target voltage for each bank in the set of banks based on one or more of: the measured temperature of the bank, a state-of-charge of the bank, and the bank's open circuit voltage characteristics.

15. The system of claim 11, wherein each bank includes one or more battery cells which are connected in parallel.

16. The system of claim 11, wherein the battery charger is configured to charge based on joint current and voltage limits.

17. The system of claim 16, wherein if the current limit is $I_L$ and the voltage limit is $V_L$, the battery charger supplies:
a constant current of $I_L$ at a voltage less than $V_L$; or
a constant voltage of $V_L$ with a current less than $I_L$.

18. The system of claim 17, wherein the controller is configured to control the battery charger to:
first supply a constant current; and
when a threshold is reached, supply a constant voltage.

19. The system of claim 11, wherein the controller includes a closed-loop control system, which uses results of the comparisons between the measured voltages and the target voltages to control the charging process.

20. The system of claim 19, wherein the closed-loop control system uses a proportional-integral-derivative (PID) controller.

21. A computer-readable storage medium storing instructions that when executed by a computer cause the computer to perform a method for charging a series battery, the method comprising:
using a battery charger to charge the series battery, wherein the series battery includes a set of banks which are connected in series, so that the same charging current passes through each bank in the set of banks;
receiving measurements of voltages across each bank in the set of banks as the series battery is charging;
for each bank in the set of banks, computing differences between the measured voltage and the target voltage for each bank to produce a set of differences for the set of banks; and
adjusting the charging process based on the set of differences between the measured voltage and the target voltage for each bank by limiting a voltage output for the charging process based on a result of a comparison of the differences in the set of differences.

22. The computer-readable storage medium of claim 21, wherein adjusting the charging process based on the set of differences involves:
determining a minimum difference in the set of differences; and
adjusting the charging process based on the minimum difference.

23. The computer-readable storage medium of claim 21, wherein the method further comprises determining the target voltage for each bank in the set of banks based on one or more of: a measured temperature of the bank, a state-of-charge of the bank, and the bank's open circuit voltage characteristics.

24. The computer-readable storage medium of claim 21, wherein adjusting the charging process involves adjusting the charging process based on joint current and voltage limits.

25. The computer-readable storage medium of claim 24, wherein if the current limit is $I_L$ and the voltage limit is $V_L$, the charging process supplies:
a constant current of $I_L$ at a voltage less than $V_L$; or
a constant voltage of $V_L$ with a current less than $I_L$.

26. The computer-readable storage medium of claim 24, wherein the charging process involves:
first supplying a constant current; and
when a threshold is reached, supplying a constant voltage.

27. The computer-readable storage medium of claim 21, wherein adjusting the charging process involves using a closed-loop control system, which uses results of the comparisons between the measured voltages and the target voltages to control the charging process.

28. The computer-readable storage medium of claim 27, wherein the closed-loop control system uses a proportional-integral-derivative (PID) controller.

* * * * *